United States Patent [19]
Cromwell

[11] Patent Number: 5,328,209
[45] Date of Patent: Jul. 12, 1994

[54] VEHICLE EXHAUST STACK JOINT YIELDABLE IN ALL DIRECTIONS

[76] Inventor: Steve D. Cromwell, Rte. 6, Box 328, Savannah, Tenn. 38372

[21] Appl. No.: 93,667

[22] Filed: Jul. 20, 1993

[51] Int. Cl.⁵ .................................. F16L 27/02
[52] U.S. Cl. .................................. 285/1; 285/283; 285/268; 285/223; 180/89.2; 403/229
[58] Field of Search ............... 285/1, 283, 62, 184, 285/118, 268, 269, 304, 223; 104/52; 110/184; 180/89.2; 114/187; 454/2; 403/229

[56] References Cited

U.S. PATENT DOCUMENTS

| | | | |
|---|---|---|---|
| 123,825 | 2/1872 | Hamilton | 434/2 |
| 2,695,630 | 11/1954 | Klein et al. | 180/89.2 |
| 2,733,033 | 1/1956 | Gunderson | 403/229 |
| 3,063,741 | 11/1962 | Bockerman | 285/283 |
| 3,345,092 | 10/1967 | Athman et al. | 285/283 |
| 3,352,573 | 11/1967 | Canning | 285/283 |
| 3,815,941 | 6/1974 | Snyder | 285/283 |
| 4,567,817 | 2/1986 | Fleischer et al. | 180/89.2 |
| 4,871,181 | 10/1989 | Usner et al. | 285/268 |
| 5,176,407 | 1/1993 | Vaughn et al. | 285/283 |
| 5,224,739 | 7/1993 | Sauter | 403/229 |

FOREIGN PATENT DOCUMENTS 170420  9/1984  Japan ................... 180/89.2

Primary Examiner—Eric K. Nicholson
Attorney, Agent, or Firm—John J. Mulrooney

[57] ABSTRACT

An omni-directional yieldable joint for a vehicle exhaust stack includes an upper cylindrical member having a pair of elongated pivot sockets mounted on its lower end; a lower cylindrical member has a pair of elongated pivot rods mounted at its upper end for riding in the pivot sockets and making the upper and lower cylindrical members pivotable with respect to each other; a pair of springs attached between the upper and lower cylindrical members holds the two sections tightly together and, when the joint pivots due to the exhaust stack striking an overhead object, the stack will lean and the springs will stretch as much as necessary until the stack passes under and clears the obstruction, whereupon the springs will pull the upper and lower sections back into their normally vertical and axial alignment.

8 Claims, 3 Drawing Sheets

VEHICLE EXHAUST STACK JOINT YIELDABLE IN ALL DIRECTIONS

BACKGROUND

This invention relates to a yieldable joint for connecting two cylindrical pipes, and more particularly to an improved yieldable joint for connecting pipes in a vertical exhaust stack such as commonly found on farm tractors, diesel trucks and other heavy equipment for conducting exhaust gases from the engine to a point above the top of the vehicle.

Low hanging overhead objects such as tree limbs and bridges are potential sources of damage to farm tractors, diesel engines and other heavy equipment because such objects are obstructions that are capable of contacting the vertically extending exhaust stacks of these vehicles. Exhaust stacks usually are not yieldable and, when struck by an overhead object, the exhaust pipe and the manifold to which it is attached may be damaged and require expensive repairs.

Ideally, an exhaust pipe that is high enough to strike an overhead object will yield during contact with the object and, after contact terminates, will automatically return to its normally vertical position without damage to the exhaust pipe, or the attached manifold, or the object. Moreover, the ideal yieldable exhaust stack will be capable of leaning in all directions (360°)—forward, rearward, left, right or between—; and will embody a construction that is not susceptible to functional failure due to rust build up, vibrations or high temperatures.

Apparatus has been proposed for yieldable exhaust stack joints. U.S. Pat. No. 3,063,741 describes a yieldable joint for exhaust stacks that is designed to yield upon contact with an overhead object and that is capable of automatically returning the stack to its vertical position after contact with the obstruction has ceased. However, this stack is capable of yielding only in a direction or plane parallel to the direction of travel of the vehicle, i.e., forward or backward. Frequently, an exhaust stack must be capable of motion in directions other than parallel to the vehicle's direction of travel, particularly for vehicles such as farm tractors which are likely to encounter tree limbs that will urge the stack in a direction that is not parallel to the direction of motion of the tractor. Moreover, an asymmetrical object such as a tree limb may urge the stack successively in several different directions with respect to the stack's normally vertical position as the contact and relative motion between the stack and limb continues. In such a situation, this prior device, which is capable of yielding only in a single direction or plane, will not prevent damage to the vehicle or overhead object. Two other prior devices for providing a yieldable joint for exhaust pipes are described in U.S. Pat. No. 3,352,573 and U.S. Pat. No. 3,815,941. Similarly, both of these prior devices are capable of yielding only in a direction parallel to forward or backward motion of the vehicle; but they are not capable of yielding to prevent damage to the exhaust stack when an overhead object forces the stack in a direction other than parallel to the vehicle's direction of travel.

SUMMARY

It is, accordingly, an object of this invention to provide a new and improved yieldable joint for exhaust stacks. It is another object of this invention to provide a 360° omni-directional, yieldable joint that will enable a vertical exhaust stack to yield and lean in any direction, or successively in a plurality of different directions, with respect to the normally vertical position of the stack or the vehicle's direction of travel. This novel joint, which can be inserted in the exhaust pipe of a vehicle, permits the exhaust pipe to move in any direction—forward, backward, left, right or any direction in between—with respect to the direction of travel of the vehicle when contacted by an overhead object and, after contact with the object has ceased, to automatically return to its vertical position. The novel construction comprises a system of elongated pivot pins and open-sided pivot sockets to provide a joint having the capacity to yield and lean in all directions with respect to the vertical exhaust stack or the direction of travel of the vehicle to insure against damage caused by contact between the stack and overhead objects.

In accordance with the present invention, an omni-directional yieldable joint for an exhaust stack comprises an upper joint section having a pair of angle irons mounted thereon to form sockets for pivot rods; a lower joint section having a pair of pivot rods mounted thereon for riding in said sockets whereby the upper and lower joint sections are pivotable with respect to each other; a pair of springs attached between the upper and lower joint sections holds the two sections tightly together and, when the joint pivots due to the exhaust stack striking an overhead object, the stack will lean and the springs will stretch as much as necessary until the stack is clear of (passes under) the obstruction, whereupon the springs will pull the upper and lower sections back into their normally vertical and axial alignment. A significant feature of the invention is that the yieldable joint is capable of yielding, i.e., leaning, in any direction—forward, backward, left right or between—with respect to the vertical position of the stack or the direction of the vehicle. The novel joint comprises a system of elongated, open-ended pivot sockets that ride on pivot rods to provide an omni-directional leaning capacity that is not possible with the sleeve and pin hinges used in the prior art devices and that are not susceptible to rusting as frequently happens to sleeve-type hinges.

DESCRIPTION OF THE PREFERRED EMBODIMENT

Figure 1:
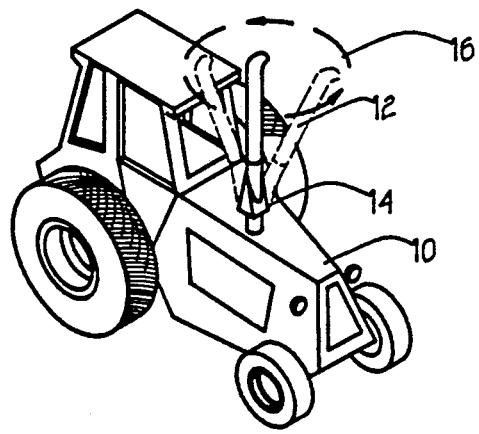
FIG. 1 is a perspective view of a farm tractor with the novel yieldable exhaust stack illustrated thereon in the normal vertical (solid lines) position and in leaning positions (dotted lines) illustrating that this improved exhaust stack joint is capable of yielding or leaning in any direction with respect to the vertical stack or direction of travel of the vehicle.
Figure 3:
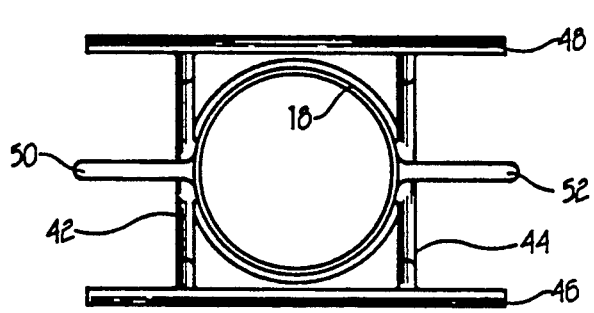
FIG. 3 is a top view of the lower joint section 18.

Referring to the drawings, a heavy equipment vehicle such as a farm tractor 10 has an exhaust stack 12 that, in its normally vertical position (solid lines), extends from the engine (not shown) to a point above the top of the vehicle. The exhaust stack has a yieldable joint 14 therein that permits the stack to lean (dotted lines) in any direction—forward, rearward, left, right or between, as indicated by the arrows 16—with respect to either its normally vertical position or the vehicle's direction of travel.

The yieldable joint 14 comprises an lower cylindrical joint member 18 adapted to fit over the upper end of a short vertical exhaust pipe 20 that connects to the engine manifold (not shown), and an upper cylindrical joint member 22 adapted to fit into the lower end of a vertical extension of the exhaust pipe 24. The upper member 22 is flared at its lower end 26 to receive the top end of bottom member 18, which has a heat resistant gasket 28 mounted around the top thereof to form a tight seal between the lower and upper members 18 and 22 and prevent the escape of exhaust gases.

An exhaust pipe clamp 30, 32 provides a tight fit between lower member 18 and the exhaust pipe 20 and an exhaust pipe clamp 34, 36 provides a tight fit between upper member 22 and the exhaust pipe 24.

Figure 5:
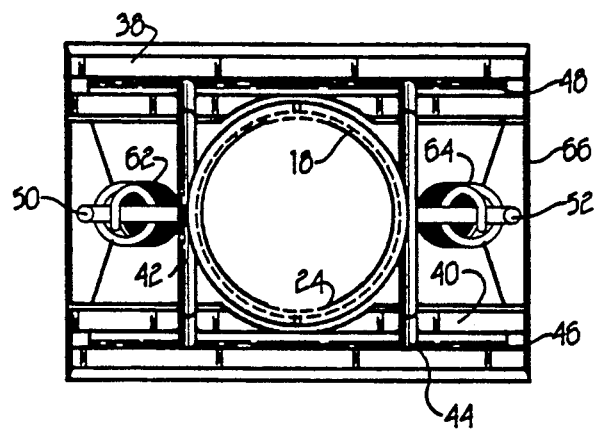
FIG. 5 is a bottom view of the yieldable joint of the present invention.
Figure 8:
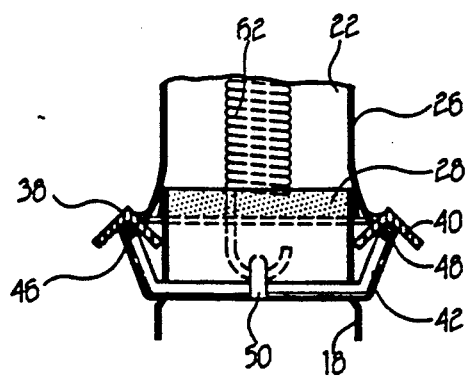
FIG. 8 is a side elevational view, partially cut away, showing in more detail the pivot sockets and the pivot rods, the spring mounting brackets, and the gasket forming the seal between the upper and lower joint sections.
Figure 2:
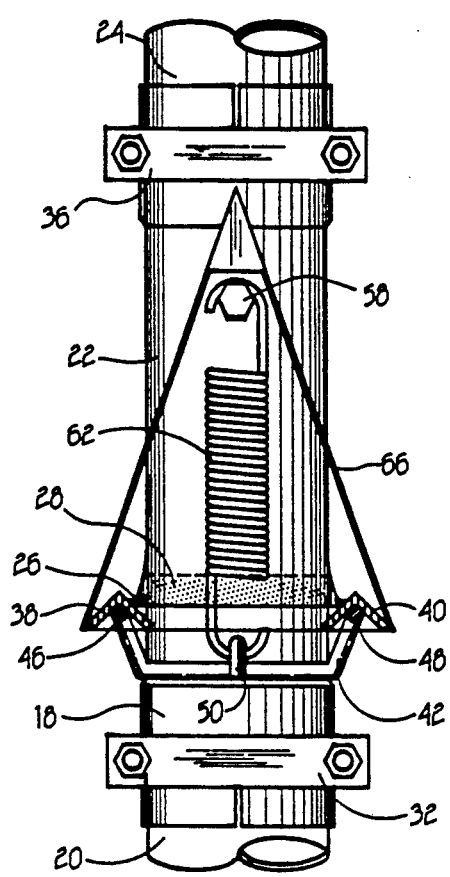
FIG. 2 is a side elevational view of the yieldable joint of the present invention.
Figure 4:
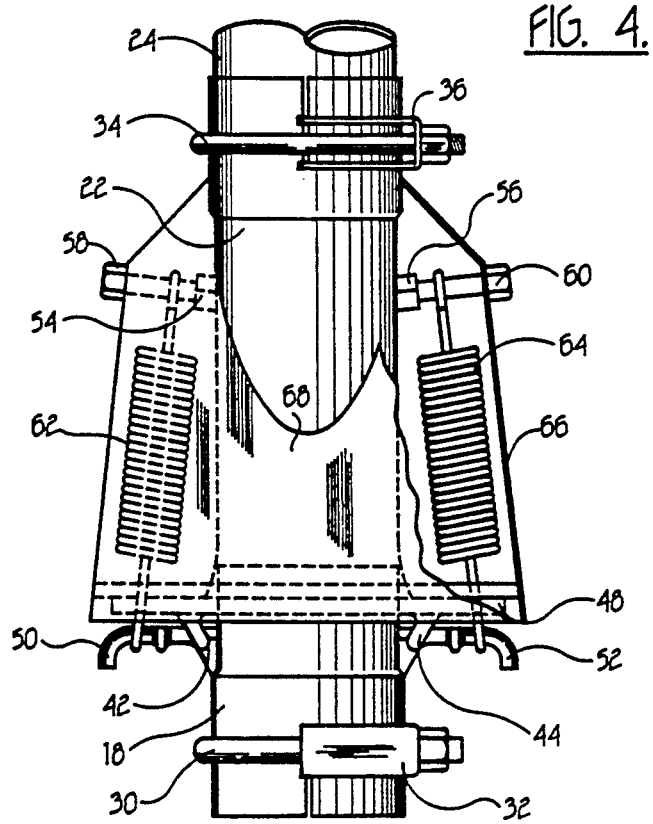
FIG. 4 is a front elevational view of the yieldable joint of the present invention.
Figure 6:
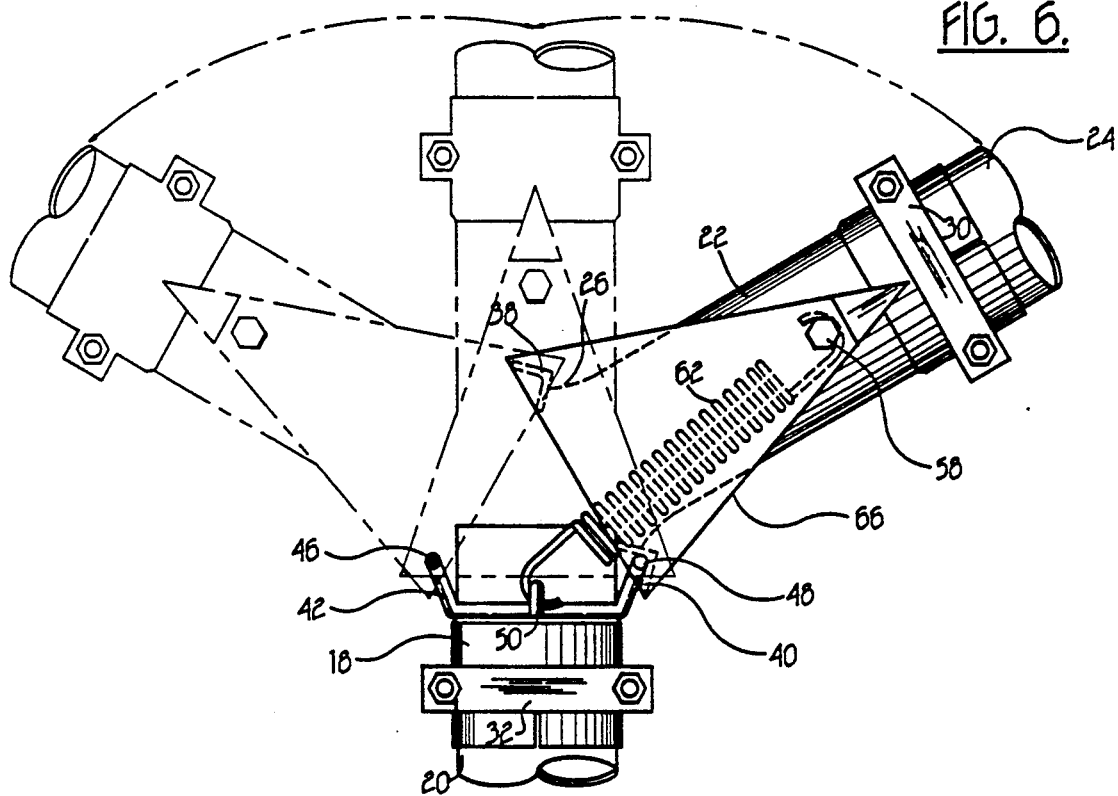
FIG. 6 is a side elevational view of the yieldable joint as seen in FIG. 2, showing the yieldable joint in its normally vertical position (dotted lines); and pivoting (leaning) in the forward direction (solid lines); and pivoting (leaning) in the rear or backward direction (dotted lines).
Figure 7:
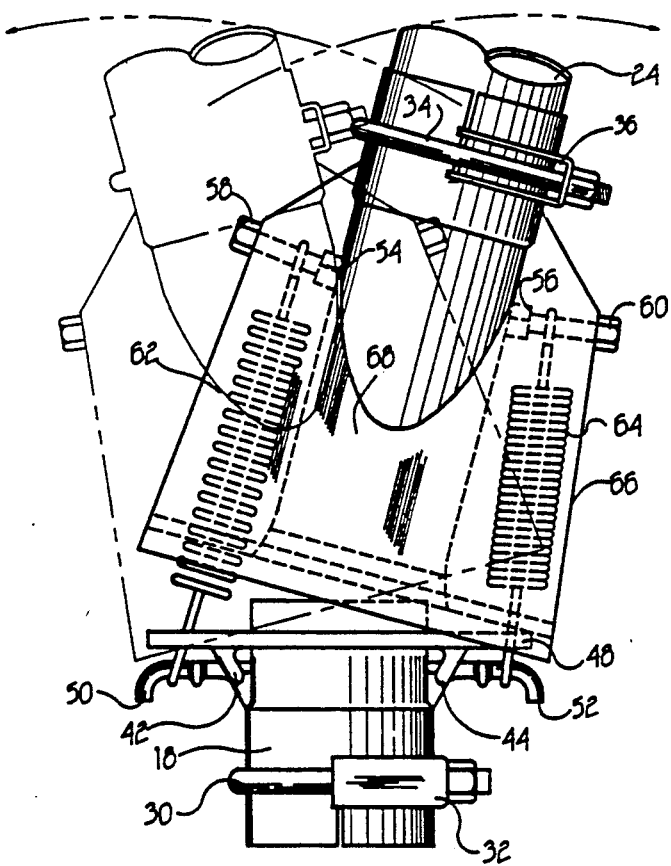
FIG. 7 is a front elevational view of the yieldable joint as seen in FIG. 4, showing the yieldable joint leaning right (solid lines) and left (dotted lines) of the joint's normally vertical position.

Referring particularly to FIGS. 2, 3, 5, 6 and 8, the omni-directional pivoting means of the yieldable joint are illustrated in detail. A pair of L-shaped angle irons 38 and 40 are mounted or affixed such as by welding in parallel relationship to opposite sides of the flared bottom end 26 of the upper member 22. These angle irons function as open-sided pivot sockets for the pivots of the yieldable joint. Brackets 42 and 44 are mounted or affixed such as by welding to opposite sides of the top end of bottom member 18 and support a pair of pivot rods 46 and 48 upon which the pivot sockets 38 and 40 ride and pivot. The pivot rods 46 and 48 have a length greater than the diameter of the upper and lower cylindrical members 18 and 22 (FIG. 3) and the open-sided pivot sockets 38 and 40 are slightly longer than the pivot rods 46 and 48 (FIGS. 4, 5 and 7).

As illustrated in the drawings, the pivot sockets 38 and 40 are spaced apart a distance slightly greater than the diameters of the cylindrical members 18 and 22 and the pivot sockets and pivot rods 46 and 48 are slightly greater in length than the diameters of the cylindrical members 18 and 22 to provide stability to the joint. The dimensions of the pivot sockets and pivot rods will vary according to the diameters of the cylindrical members 18 and 22, which, in turn, will vary according to the different sizes of exhaust pipes into which the joint will be inserted. For example, an experimental model of the yieldable joint adapted for use in an exhaust stack having three (3) inch diameter exhaust pipes has the following dimensions: pivot rods—⅜ inch round steel rods, 5½ inches in length; pivot sockets—1 inch angle irons, 6 inches in length. The pivot sockets 38 and 40 are one-half inch longer than the pivot rods 46 and 48 to provide a ¼ inch overhang of the sockets to which the housing plates 66 may be welded.

A pair of spring mounting brackets 50 and 52 are mounted or affixed such as by welding on opposed sides of the top end of bottom member 18. Brackets 50 and 52 have ends that are turned down to prevent the springs (hereinafter described) from coming off when subjected to vibrations. A pair of threaded nuts 54 and 56 are mounted or welded on opposed sides of upper member 22 and a pair of bolts 58, 60 are screwed into the threaded nuts 54, 56. The bolts 58 and 60 provide spring mounting brackets for a pair of heat resistant coil springs 62 and 64 that are connected between bracket 50 and bolt 58 and bracket 52 and bolt 60, respectively. The springs 62 and 64 hold the bottom and upper members 18 and 22 tightly together in vertical, axial alignment and, when the yieldable joint pivots due to the exhaust stack striking an overhead object, the springs stretch as much as necessary to permit the joint to pivot and the stack to lean to the extent necessary to pass under the object; and when the exhaust stack is clear of the object, the springs 62 and 64 pull the bottom and upper members 18, 22 back together in their normally vertical, axial aligned position.

The invention includes an optional, protective housing for the yieldable joint that is illustrated FIGS. 2 and 4–7. The protective housing comprises a pair of triangular sheets 66 of flat steel plate that are welded to the ends of the pivot sockets 38 and 40 (FIGS. 5 and 6) to cover the sides of the joint, allowing for sufficient clearance to permit the springs 62 and 64 to move freely. The protective housing further comprises another pair of steel plates 68 that are welded along the outer edges of the pivot sockets 38 and 40 (FIGS. 4 and 7) to cover the front and back sides of the joint. The four steel plates form a protective housing around the joint.

Thus, it can be seen that the present invention accomplishes its objectives of providing a yieldable joint for a vertical exhaust stack on a vehicle that is capable of leaning in any direction with respect to the vertical stack or the direction of travel of the vehicle.

Wherefore, having thus described my invention, what is claimed is:

1. A yieldable joint for enabling a vertical exhaust stack of a vehicle to lean in any direction with respect to vertical or a direction of travel of said vehicle comprising:

a lower cylindrical member having a top end and a bottom end; a pair of pivot rods mounted in parallel relationship on opposite sides of said top end of said lower member, said pivot rods having a length greater than the diameter of said lower member; a first pair of spring mounting brackets affixed to opposite sides of said lower member;

an upper cylindrical member having a top end and a bottom end; a pair of open-sided pivot sockets mounted in parallel relationship on opposite sides of said bottom end of said upper member, said pivot sockets being positioned to ride on said pivot rods when said lower and upper members are positioned in vertical axial alignment and said pivot sockets being slightly longer than said pivot rods; a second pair of spring mounting brackets affixed to opposite sides of said upper member in vertical alignment with said first pair of spring mounting brackets;

a pair of springs connected between said first and second pairs of spring mounting brackets for holding said lower and upper members in a vertically aligned position and for biasing said members toward said vertically aligned position.

2. A yieldable joint as claimed in claim 1 in which said open-sided pivot sockets comprise L-shaped angle irons.

3. A yieldable joint as claimed in claim 1 in which said bottom end of said upper member is flared to receive said top end of said lower member and said lower member has a heat resistant gasket between said lower and upper members.

4. A yieldable joint as claimed in claim 1 in which said bottom end of said lower member is adapted to fit over the upper end of a vehicle exhaust pipe and said top end of said upper member is adapted to fit into a vertical extension of said vehicle exhaust pipe.

5. A yieldable joint as claimed in claim 1 in which said springs comprise a pair of heat resistant coil springs that are positioned in parallel relationship in longitudinal alignment with said lower and upper members along sides of said members that are between said pivot sockets and pivot rods.

6. A yieldable joint as claimed in claim 1 further comprising a protective housing surrounding said pivot sockets, said pivot rods and said springs.

7. A yieldable joint for enabling a vertical exhaust stack of a vehicle to lean in any direction with respect to a direction of travel of said vehicle comprising:

a lower cylindrical member having a top end and a bottom end, said top end having a heat resistant gasket mounted around the top thereof; pair of pivot rods mounted in parallel relationship on opposite sides of said top end of said lower member, said pivot rods having a length greater than the diameter of said lower member; a first pair of spring mounting brackets affixed to opposite sides of said lower member between said pivot rods;

an upper cylindrical member having a top end and a bottom end, said bottom end having a flare to receive said heat resistant gasket mounted at the top end of said lower member; a pair of L-shaped angle irons mounted in parallel relationship on opposite sides of said flared bottom end of said upper member, said angle irons being positioned to ride on said pivot rods when said lower and upper members are positioned in vertical axial alignment and said angle irons being slightly longer than said pivot rods; a second pair of spring mounting brackets affixed to opposite sides of said upper member between said angle irons and in vertical alignment with said first pair of spring mounting brackets;

a pair of heat resistant coil springs connected between said lower and upper members on said first and second pairs of spring mounting brackets for holding said lower and upper members in a vertically aligned position and for biasing said members toward said vertically aligned position.

8. A yieldable joint as claimed in claim 7 further comprising a protective housing surrounding said pivot sockets, said pivot rods and said springs.

* * * * *